United States Patent [19]
Sato

[11] 3,738,173
[45] June 12, 1973

[54] TEMPERATURE SENSING PROBE AND DISPOSABLE PROBE COVER

[75] Inventor: Stephens N. Sato, San Diego, Calif.
[73] Assignee: Ivac Corporation, San Diego, Calif.
[22] Filed: Nov. 22, 1971
[21] Appl. No.: 200,748

Related U.S. Application Data
[62] Division of Ser. No. 28,367, April 14, 1970.

[52] U.S. Cl.......... 73/343 R, 73/362 AR, 136/221, 206/16.5, 338/28
[51] Int. Cl........ G01k 1/08, G01k 1/00, G01k 1/16
[58] Field of Search.................. 73/362 AR, 343 R; 206/16.5; 136/230, 232, 221; 338/28; 32/30; 150/52 R

[56] References Cited
UNITED STATES PATENTS

| | | | |
|---|---|---|---|
| 1,517,186 | 11/1924 | Bond | 32/30 |
| 2,890,429 | 6/1959 | Baker | 73/362 AR |
| 3,254,533 | 6/1966 | Tongret | 73/362 AR |
| 3,349,896 | 10/1967 | Ensign et al. | 73/362 AR |
| 3,377,862 | 4/1968 | Gheorghiu | 73/362 AR |
| 3,500,280 | 3/1970 | Ensign | 73/362 AR |
| 3,592,059 | 7/1971 | Chilton | 206/16.5 |
| 3,379,063 | 4/1968 | Schonberger | 73/362 AR |
| 2,886,683 | 5/1959 | Klavitter | 73/367 AR |

Primary Examiner—Richard C. Queisser
Assistant Examiner—Denis E. Corr
Attorney—Fulwider, Patton, Rieber, Lee & Utecht

[57] ABSTRACT

Thermometer apparatus including an elongated, temperature sensing probe having a combined finger grip and mounting collar at one end with a concentric shaft resiliently urged forwardly of the leading end of the collar, the end of the shaft remote from the collar having a thermistor heat sensing tip. A disposable cover in the form of a rigid, thermally insulating tube having a heat conducting shield at the tip of the cover is adapted to slide over the probe shaft and engage cover retaining means on the collar, the cover shield engaging the sensing tip and driving the probe shaft rearwardly toward the collar during cover installation prior to temperature measurement. The cover is selectively ejected after temperature measurement by manually driving the probe shaft forwardly of the mounting collar with sufficient force to disengage the cover from the retaining means.

13 Claims, 10 Drawing Figures

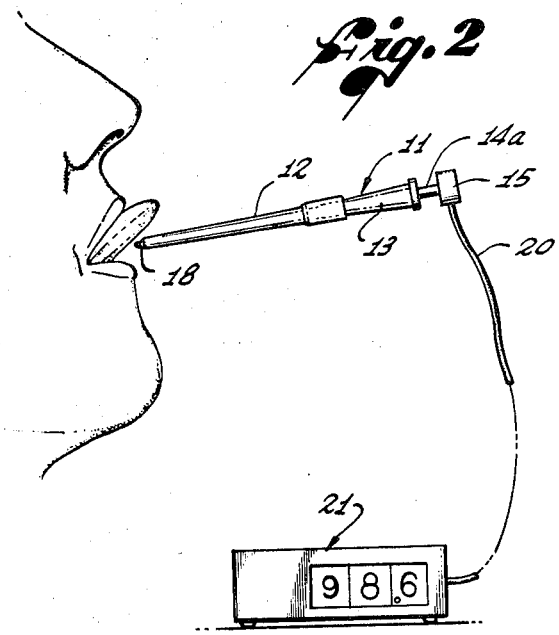
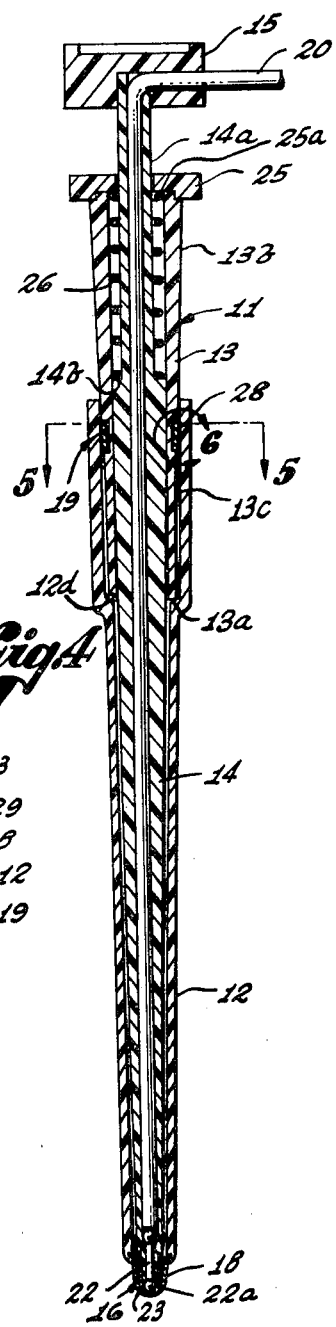
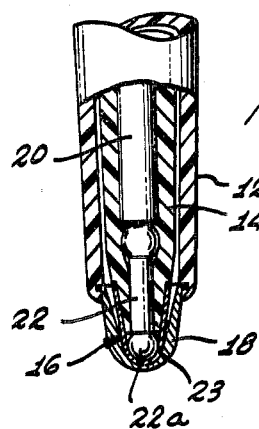

PATENTED JUN 12 1973 3,738,173
SHEET 3 OF 3
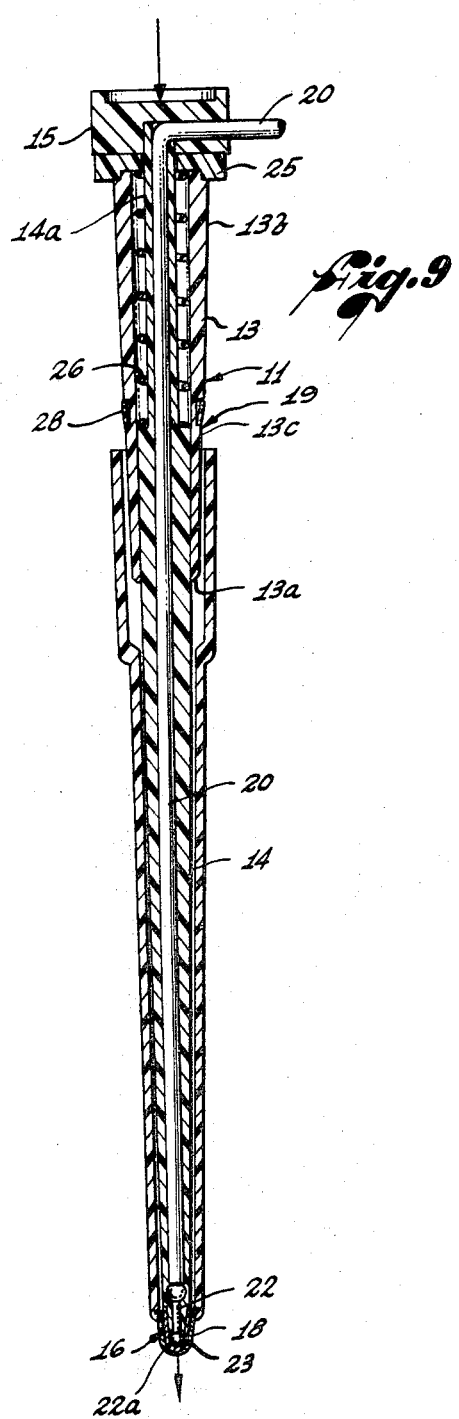
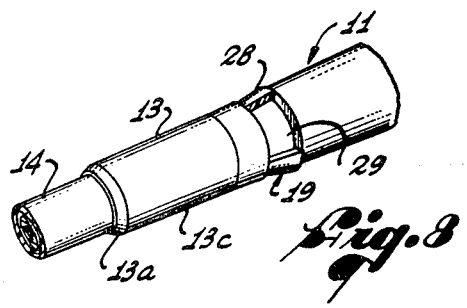
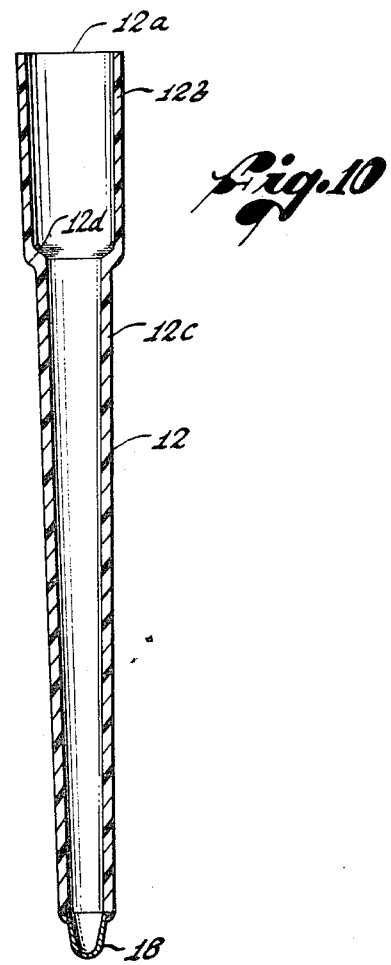
Fig.8
Fig.9
Fig.10

TEMPERATURE SENSING PROBE AND DISPOSABLE PROBE COVER

This is a division, of application Ser. No. 28,367, filed Apr. 14, 1970.

This invention relates generally to improvements in thermometer devices and, more particularly, to a new and improved temperature sensing probe and disposable probe cover, the probe and cover being adapted for use with an electronic thermometer.

It is common practice in the medical arts, as in hospitals and in doctors' offices, to measure the body temperature of a patient by means of a glass bulb thermometer incorporating a heat responsive mercury column which expands and contracts adjacent a calibrated temperature scale. Typically, the glass thermometer is inserted into the patient, either orally or rectally, and subsequently removed after a sufficient time interval has passed to enable the temperature of the thermometer to stabilize at the body temperature of the patient. This time interval is usually of the order of 2 to 4 minutes. After a sufficient period of time has elapsed, the thermometer is removed from the patient and is subsequently read by appropriate medical personnel.

In order to make another temperature measurement, e.g., either on a second patient or on the same patient at a later time, a second, sterile thermometer must be used, or the first thermometer must be cleaned, sterilized and redistributed prior to reuse.

It will be apparent from the foregoing that conventional temperature measurement procedures using glass bulb thermometers are prone to a number of very significant deficiencies. In this connection, glass bulb thermometers are rather fragile devices which are easily broken and, indeed, such breakage is very common. In addition, temperature measurement is rather slow and, for patients who cannot be relied upon (by virtue of age or infirmity) to properly retain the thermometer for the necessary period of insertion in the body, may necessitate the physical presence of medical personnel during a relatively long measurement cycle, thus wasting valuable time. Furthermore, glass bulb thermometers are not as quick and easy to read, particularly under poor lighting conditions. Moreover, such thermometers require a considerable degree of physical handling by the medical personnel who use them, thus increasing the chances of reinfecting a patient or of cross-contamination between patients. In addition, and as previously pointed out, glass thermometers require a costly sterilization and redistribution process.

Various attempts have been made by the prior art to minimize or eliminate the aforedescribed deficiencies of the glass bulb thermometer by using temperature sensing probes of less fragile construction which are designed to operate in conjunction with direct reading electrical thermometer instrumentation. However, such probes and electrical thermometers have typically proven to be relatively slow in making temperature measurements, and it is still necessary to competely sterilize the probe after each use. Therefore, a large supply of probes is necessary and the relatively expensive sterilization and redistribution costs still remain.

It is also known in the prior art to provide flexible and resilient covers or sheaths for both glass bulb thermometers and electrical probes. However, such prior art devices are still slow and must be physically handled by medical personnel during installation and removal, with the resultant possibility of contamination. Furthermore, such sheaths and covers are generally prone to puncturing, tearing, or being stretched out of shape. In addition, such protective sheaths have not always provided ideal thermal contact between the sheath and the temperature sensing zone of the thermometer or probe and, consequently, the use of such protective sheaths may not produce consistently reliable and accurate results. Moreover, protective sheaths for glass bulb thermometers and electrical probes have typically been rather expensive.

Hence, those concerned with the development and use of thermometer apparatus in the medical field have long recognized the need for improved temperature measurement devices which result in accurate, reliable, rapid and easily obtained readings, are disposable and inexpensive, and which obviate the problems of breakage, sterilization, redistribution, and contamination. The present invention fulfills these needs.

SUMMARY OF THE INVENTION

Briefly, and in general terms, the present invention provides a new and improved temperature sensing probe and a new and improved cover adapted for selective mounting on such a probe and selective ejection therefrom. The temperature sensing probe and probe cover are particularly adapted for use with electronic temperature measuring instrumentation.

Basically, the present invention includes a temperature sensing probe having a thermal sensor device mounted at the leading end of a probe shaft which is resiliently urged forwardly of a concentric outer collar having retaining means for engaging a suitably installed probe cover, installation of the cover over the probe shaft effecting movement of the shaft rearwardly towards the collar, whereby the sensing tip of the shaft is urged against a heat conductive shield at the leading end of the cover, the shape and dimensions of the mounting collar cooperating with the shape and dimensions of the probe cover to limit rearward axial movement of the cover. Manual means are provided to selectively drive the probe shaft forwardly of the mounting collar with sufficient force to disengage the cover from the retaining means and thereby selectively eject the cover from the probe. The retaining means is designed to facilitate easy installation of the cover onto the probe and positive ejection therefrom.

More specifically, and in a presently preferred embodiment, by way of example and not necessarily by way of limitation, the temperature sensing probe includes a combined finger grip and mounting collar and a concentric probe shaft passing through the center of the collar and resiliently urged forwardly of one end of the collar, an extension of the shaft at its trailing end projecting through an opening at the rear of the collar and terminating in an ejection button. The probe cover is a rigid, hollow, heat insulating tube, open at one end and terminating at its opposite end in a heat conductive tip shield having a prescribed thermal mass.

During installation, the tip shield engages the sensing tip at the leading end of the probe shaft and drives the shaft rearwardly until the open end of the cover engages the retaining means and a limit stop of the mounting collar. Since the sensing tip of the probe shaft is continuously urged against the cover tip shield, intimate heat conducting contact between the shield and the sensing tip is assured throughout the temperature measurement process. The dimensions of the probe cover are such that the axial distance between the inside surface of the tip shield and the portion of the cover in engagement with the retaining means is less than the distance from the sensing tip of the probe shaft to the retaining means prior to cover installation, thus assuring that cover installation will drive the probe shaft rearwardly during installation and provide the desired physical contact between the sensing tip and the cover top shield.

The retaining means on the mounting collar is preferably in the form of a canted, resilient, split ring, the ring being initially caused to close as the cover is passed over the ring, and the ring being subsequently compressed by the inner walls of the cover, so that the cover passes easily over the ring into positive frictional engagement, the static friction holding the cover on the collar being greater than the forces resiliently urging the probe shaft and cover away from the collar.

After temperature measurement, the ejection button is manually advanced towards the rear of the mounting collar, thereby advancing the probe shaft and cover forwardly of the collar until the cover disengages from the retaining means, whereupon the resilient forces eject the cover from the probe.

The probe cover is not touched by personnel at any time prior to installation of the cover on the probe, nor is the cover touched during installation, during temperature measurement, during ejection from the probe or after disposal, thus assuring sanitary conditions and avoiding cross-contamination from equipment or physical handling.

Probe covers are typically provided in a package, such as a box, with the open ends of the covers accessible through an open end of the package. Therefore, in order to install a fresh cover, the leading end of the probe is simply inserted into one of the covers through the open end of the cover until the cover engages the retaining means and limit stop on the probe mounting collar. Each cover is installed, used and ejected in the same easy, rapid and reliable manner.

The probes and probe covers are of relatively strong construction, typically of molded plastic and metal, and are not easily broken, the probe covers being relatively inexpensive. In addition, ideal thermal contact between the probe cover and the temperature sensing tip of the probe shaft is provided, thus assuring consistently reliable and accurate transducer input to the appropriate electrical thermometer instrumentation.

The temperature sensing probe and disposable probe cover of the present invention, when used in conjunction with appropriate electronic thermometer instrumentation, result in accurate, reliable, rapid and easily obtained readings, the probe cover being inexpensive and capable of easy installation and removal without requiring direct physical contact with the human operator. In addition, the problems of sterilization and redistribution are completely obviated, and problems of breakage, re-infection and cross-contamination are minimized The above and other objects and advantages of this invention will become apparent from the following more detailed description, when taken in conjunction with the accompanying drawings of illustrative embodiments.

DESCRIPTION OF THE DRAWINGS

FIG. 2 is a perspective view illustrating the manner in which the temperature sensing probe, with a probe cover installed, is used to take temperature orally;

FIG. 4 is an enlarged, longitudinal sectional view through a temperature sensing probe with the probe cover installed, all constructed in accordance with the present invention;

FIG. 5 is an enlarged, sectional view, taken along the lines 5—5 in FIG. 4;

FIG. 6 is an enlarged, fragmentary sectional view of the area "6" in FIG. 4 and illustrates the cooperation between the mounting collar retaining means and the probe cover;

FIG. 7 is an enlarged, partial perspective view, portions being shown in section, of the leading end of the probe and probe cover shown in FIG. 4;

FIG. 8 is a partial perspective view, portions being shown in section, of the mounting collar portion of the temperature probe;

FIG. 9 is an enlarged, longitudinal sectional view, similar to FIG. 4, but with the probe cover shown in the process of ejection; and FIG. 10 is an enlarged longitudinal sectional view through a disposable probe cover constructed in accordance with the invention.

DETAILED DESCRIPTION

Figure 1:
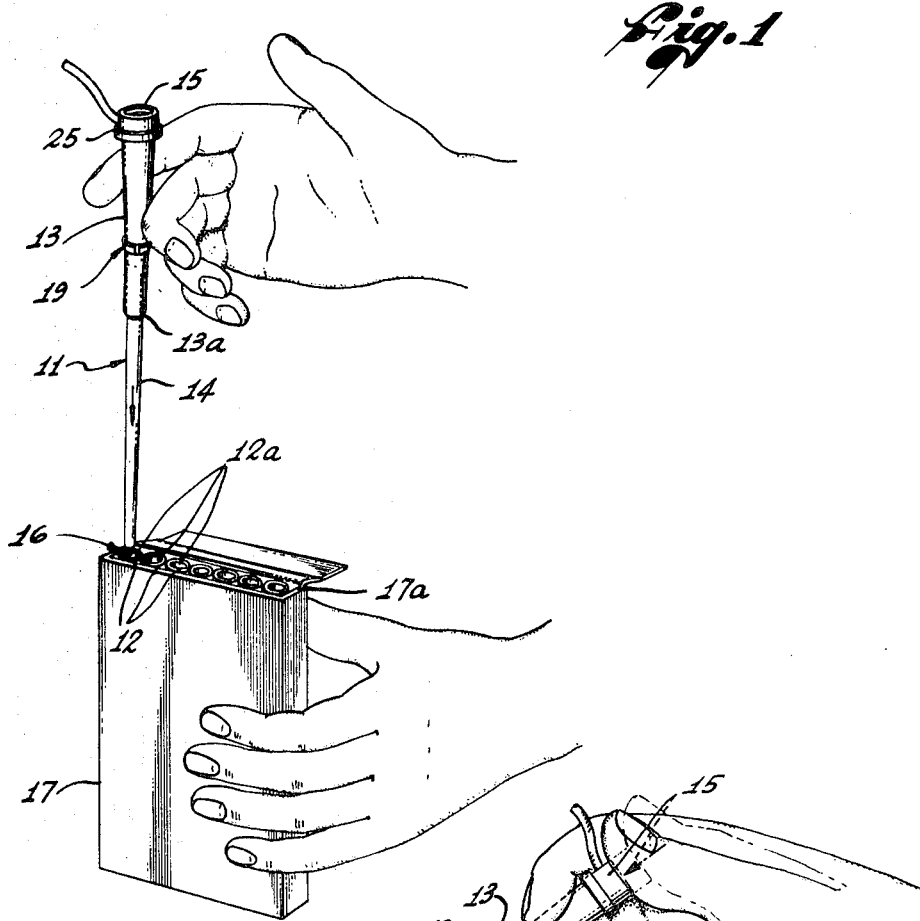
FIG. 1 is a perspective view illustrating the manner in which a temperature sensing probe is inserted into a probe cover to effect cover installation, in accordance with the present invention.
Figure 3:
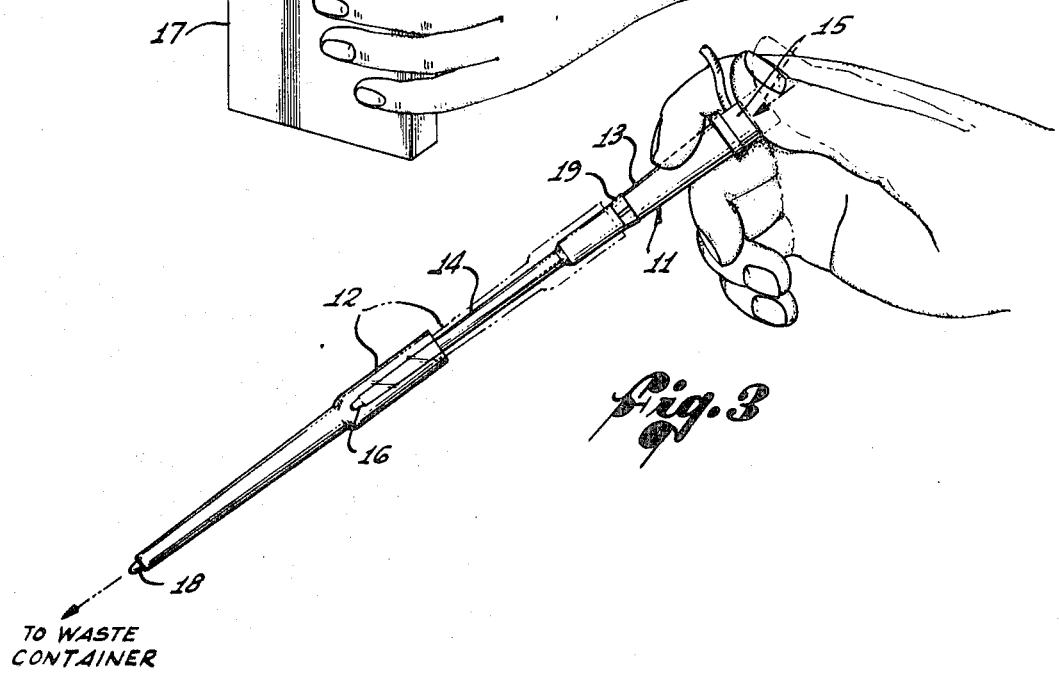
FIG. 3 is a perspective view illustrating the manner in which an installed probe cover is subsequently ejected from the temperature sensing probe after use.

Referring now to the drawings, FIGS. 1, 2 and 3 illustrate the general construction and use of the temperature sensing probe and disposable probe cover of the present invention, including installation of a probe cover onto the probe, making a temperature measurement, and subsequent ejection of the probe cover from the probe after use.

FIG. 1 best illustrates the manner in which a temperature sensing probe 11 is inserted into a probe cover 12 to accomplish cover installation prior to making a temperature measurement. The probe 11 has a combined finger grip and mounting collar 13 and a concentric probe shaft 14 passing through the center of the collar and resiliently urged forwardly of the leading end 13a of the collar, an extension of the probe shaft at its trailing end 14a (FIG. 2) projecting through an opening at the rear of the collar and terminating in an ejection button 15. The leading end of the probe shaft 14 includes a thermal sensor device defining a heat sensing tip 16. The physical shape and arrangement of the collar 13 and ejection button 15 are such that the probe 11 can be conveniently gripped and operated for probe cover installation and ejection in a manner similar to that for handling a hypodermic syringe. As such, the feel and handling of the probe of the present invention is quite natural to medical personnel.

As shown in FIG. 1, a plurality of probe covers 12 are typically packaged in a box 17 or other suitable container for subsequent use, the probe covers being disposed side by side with their longitudinal axes parallel to the longer axis of the box, and with all of the open ends 12a of the covers accessible through the open end 17a at the top of the box.

In order to install one of the probe covers 12 onto the probe 11, the collar 13 is grasped in the manner shown in FIG. 1 and the probe shaft 14 is inserted through the open end 12a of the prove cover into the main body of the cover. As previously indicated, the probe shaft 14 is resiliently urged forwardly of the collar 13. Therefore, when the heat sensing tip 16 of the probe shaft 14 encounters a rigid tip shield 18 at the closed end of the probe cover 12, continued advancement of the probe into the probe cover results in the probe shaft being driven rearwardly towards the collar 13 until the probe cover engages both a retaining means 19 and the leading end 13a of the mounting collar.

With the cover 12 thus installed upon the probe 11, a temperature measurement can be made in the manner shown in FIG. 2. In this regard, FIG. 2 illustrates insertion for an oral temperature measurement. The leading end of the probe and cover assembly is inserted under the tongue of the patient, and the temperature sensed is converted to an electrical signal which is directed over a cable 20 as input to appropriate electronic thermometer instrumentation 21. While the thermometer instrumentation 21 is illustrated as a device which provides direct digital readout in the form of an alphanumeric display, it is to be understood that this is by way of example only, and any suitable thermometer instrumentation may be used without departing from the spirit and scope of the present invention.

It will be noted in FIG. 2 that, upon installation of the probe cover 12, the trailing end 14a of the probe shaft 14 and the ejection button 15 are moved rearwardly from the mounting collar 13. Hence, as best observed in FIG. 3, by grasping the mounting collar 13 and placing the thumb on the ejection button 15, in the same fashion in which a hypodermic syringe is manipulated, the ejection button can be manually advanced towards the rear of the mounting collar, thereby advancing the probe shaft 14 and cover 12 forwardly of the collar until the cover disengages from the retaining means 19 and is thus ejected from the probe 11 under the influence of gravity, or by the resilient forces biasing the probe shaft forwardly of the mounting collar, or by a combination of both. It will be noted in FIG. 3, that the phantom position of the probe cover 12 illustrates the probe cover at a point where it has just disengaged from the retaining means 19, the position of the cover illustrated in solid outline showing the probe cover as it leaves the probe 11 under the influence of gravity.

It will be apparent from the foregoing description of the installation and ejection of a probe cover 12, and the manner in which temperature measurements are made, that a new, clean and disposable probe cover is used for each new temperature measurement, and medical personnel only handle the probe 11 which never comes into direct physical contact with the patient. The probe cover 12 is never touched by personnel at any time, either prior to installation of the cover onto the probe 11, during installation of the cover onto the probe, during an actual temperature measurement, during ejection of the cover from the probe, or after probe disposal. Thus, sanitary conditions are assured and problems of infection and cross-contamination from equipment or physical handling are avoided.

Referring now more particularly to FIGS. 4 through 10 of the drawings, the physical construction of the probe 11 and probe cover 12 will be described in greater detail.

As best observed in FIGS. 4 through 7 of the drawings, the probe 11 includes the collar 13 and the probe shaft 14. The probe shaft 14 is an elongated, hollow, tapering member which may be suitably formed of any substantially non-heat conductive material, such as a polycarbonate thermoplastic or the like. The hollow probe shaft 14 may be formed by two mating, complimentary half-sections (not shown) to facilitate installation of the electrical cable 20 and a temperature sensing transducer 22. The half-sections defining the probe shaft 14 are ultimately secured together by any appropriate means, such as an adhesive.

The transducer 22 may be a thermistor or any other device sensitive to changes in temperature and capable of electrical monitoring. The transducer 22 is mounted within the probe shaft 14 at the leading end of the shaft, and the transducer is held in position by any suitable means, as by adhesive or the like.

A heat conductive shield 23, of aluminum, copper, gold, silver or the like, in the form of an inverted, blunt cone is secured to the leading end of the probe shaft surrounding the temperature sensing surface 22a of the transducer 22 and in intimate heat conducting contact with the transducer. In this connection, the shield 23 may be bonded to the transducer 22 and the probe shaft 14 with a heat conductive epoxy material. The shield 23 protects the transducer 22 against damage from physical handling, the shield and transducer together defining the sensing tip 16 of the probe 11.

The collar 13 is a tapered, hollow tube which includes a finger grip or handle portion 13b, a limit stop for the cover 12 at the leading end 13a of the collar, and a cover retaining means 19 at a cover mounting portion 13c of the collar. The collar 13 is also made of a substantially non-heat conductive material, such as polycarbonate thermoplastic or the like.

The collar 13 surrounds the probe shaft 14 and is concentric with the probe shaft, the shaft being in sliding engagement with the collar along the common longitudinal axis of the shaft and collar. In this regard, the probe shaft 14, in the region remote from the sensing tip 16, has a reduced diameter portion defining a shoulder 14b facing towards the trailing end 14a of the shaft. The trailing end 14a of the probe shaft 14 projects through an opening in an end cap 25 mounted on the collar 13 and terminates in the ejection button 15. The electrical cable 20 exits from the ejection button 15 through an appropriate passageway provided in the button.

A relatively weak coil spring 26 surrounds the reduced diameter portion of the probe shaft 14 within the collar 13 and extends between the shoulder 14b and the inside face 25a of the end cap 25. The spring 26 resiliently urges the probe shaft 14 forwardly of the leading end 13a of the collar 13. Hence, prior to installation of a probe cover 12 onto the probe 11, the normal position of the probe shaft 14 is in its fully extended position with the ejection button 15 in abutment with the collar end cap 25, as shown in FIG. 1.

The resilient forces applied by the spring 26 to the probe shaft 14 must be weaker than the static friction of the retaining means 19 which holds the probe cover 12 on the collar 13, so that the probe cover will not be inadvertently ejected from the probe while a temperature measurement is being made.

As best observed in FIGS. 4, 5, 6 and 8, the retaining means 19 on the mounting collar 13 is preferably in the form of a canted, resilient, split ring 28 seated within a circumferential groove 29 formed in the collar. The ring 28 is typically fabricated of a resilient, plastic material. The split ring 28 is initially caused to close as the probe cover 12 is passed over the ring during cover installation, so that the ends of the ring ultimately meet (as shown at 30 in FIG. 5), the ring being subsequently compressed by the inner walls of the probe cover, so that the cover passes easily over the ring into positive friction engagement, the static friction holding the probe cover on the collar being greater than the forces of the spring 26 resiliently urging the probe shaft 14 and the cover forwardly of the leading end 13a of the collar 13.

Referring now more particularly to FIG. 10 of the drawings, the probe cover 12 is an elongated, tapered, hollow tube, open at its wider end 12a and terminating at its narrower end in the heat conductive, rigid tip shield 18. The probe cover 12 includes an enlarged diameter portion 12b adjacent the open end 12a, the portion 12b having an inside diameter which is slightly greater than the outside diameter of the probe collar 13 in the region of the retaining means 19, yet slightly smaller than the diameter of the split ring 28 prior to compression of the ring by installation of the cover onto the probe 11. The cover 12 includes a tapered reduced diameter portion 12c which, at the junction with the larger diameter portion 12b, defines a shoulder 12d. As best observed in FIG. 4, the shoulder 12d is adapted to engage the leading end 13a of the collar 13 during probe cover installation and thereby cooperate with the collar 13 to define a limit stop for movement of the cover 12 and probe shaft 14 towards the rear of the collar.

The longitudinal dimensions of the probe cover 12 are such that the axial distance between the inside surface of the rigid tip shield 18 and the area of the enlarged portion 12b in contact with the ring 28 in FIG. 4 is less than the distance from the sensing tip 16 of the probe shaft 14 to the ring 28 when the probe shaft is in its fully extended position, i.e., prior to installation of the probe cover. Hence, installation of the cover 12 onto the probe 11, as shown in FIG. 4, brings the inside surface of the tip shield 18 into contact with the shield 23 of the sensing tip 16 and drives the probe shaft 14 rearwardly until the leading end 13a of the collar 13 abuts the shoulder 12d of the cover, the cover being subsequently held in that position by the static friction forces between the ring 28 and the inside surface of the cover. The rigid tip shield 18 of the cover 12 protects the sensing tip 16 of the probe shaft 14 and, since the sensing tip of the probe shaft is continuously urged against the tip shield of the probe cover, intimate heat conducting contact is assured throughout the temperature measurement process, thus enabling more accurate and reliable readings. Moreover, the rigid probe cover 12 is not susceptible to stretching or tearing.

Referring now more particularly to FIG. 9, after temperature measurement the ejection button 15 is manually advanced towards the end cap 25 at the rear of the probe collar 13, thereby advancing the probe shaft 14 and probe cover 12 forwardly of the collar until the cover disengages from the ring 28. At this point, the cover 12 is free to drop off the probe 11 into any suitable container (not shown) designated for disposal purposes.

The main body of the probe cover 12, consisting of the portions 12b and 12c, may be formed as an integral unit from any suitable substantially non-heat conductive material, such as plastic, nylon or the like. Typically, the cover 12 is injection molded of polystyrene plastic.

The tip shield 18 of the probe cover 12, like the shield 23 of the probe shaft 14, is in the shape of an inverted, blunt cone and is formed of a good heat conductive material which is also sufficiently strong and rigid to provide adequate protection for the sensing tip 16. Typical examples of such materials are aluminum, copper, gold, silver or the like. The shield 18 may be installed at the leading end of the probe cover 12 by any appropriate process, as by ultrasonic bonding or by placing the tip into a suitable mold and molding the main body of the probe cover directly around the shield.

As previously indicated, the temperature sensing probe 11 and disposable probe cover 12 of the present invention are particularly adapted for use with electronic thermometer instrumentation. Such instrumentation may be of the type which requires a precisely defined thermodynamic environment in the region of the sensing tip 16 in order to provide accurate temperature readings, particularly where the instrumentation uses some form of extrapolation to speed up temperature readings on an approximation basis. In this connection, the tip shield 18 of the probe cover 12 may be required to have a precise "heat mass" depending upon the nature of the electronic instrumentation with which the cover and the probe 11 are ultimately used. The "heat mass" is defined as a combination of shape, surface area, mass and specific heat for the tip shield 18, so that a prescribed heat rate through the shield to the sensing tip 14 will exist at certain specified temperature differentials. It will be apparent that, since the tip shield 18 is formed separately and is subsequently combined with the main body of the probe cover 12, that the probe covers can be fabricated with different tip shields of preselected heat mass to meet the requirements of any desired electronic thermometer instrumentation.

The temperature sensing probe 11 and probe cover 12 of the present invention are of rugged, reliable and economical construction, and ideal thermal contact is provided between the probe cover and the temperature sensing tip of the probe shaft, so that consistently accurate and reliable transducer input to electrical thermometer instrumentation is assured. The probe cover 12 is relatively inexpensive and capable of easy installation and removal without requiring direct physical contact with the human operator. Hence, the problems of sterilization and redistribution are avoided, and problems of infection and cross-contamination are minimized.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A temperature sensing probe and ejectable probe cover, comprising:

a cover mounting collar having a leading end;
cover retaining means on said collar;
an elongated probe shaft, concentric with said mounting collar and slidable along the common axis of said collar and said shaft between projected and retracted states, said shaft having a temperature sensing tip;
biasing means for resiliently urging said probe shaft and said sensing tip forwardly of the leading end of said mounting collar; and
a substantially rigid tubular cover, separate from the structure defining said probe, and ejectable from said probe, said cover having a mounting end and a sensing end, said mounting end being open and in engagement with said cover retaining means, said sensing end of said cover being closed and said temperature sensing tip of said probe shaft being resiliently biased into engagement with said sensing end, whereby said probe shaft is maintained in a retracted state while said cover is mounted on said probe and said probe shaft moves to a projected state upon ejection of said cover from said probe.

2. A combination as set forth in claim 1, wherein:
the forces exerted by said biasing means are insufficient to overcome the static friction between said cover retaining means and said tube.

3. A combination as set forth in claim 2, wherein:
said retaining means includes a resilient, split ring seated in a circumferential groove defined in said mounting collar, said groove being spaced rearwardly of said leading end of said collar.

4. A combination as set forth in claim 2, and further comprising:
ejection means for manually advancing said probe shaft forwardly of said mounting collar to eject said cover.

5. A combination as set forth in claim 4, wherein:
said probe shaft includes a reduced diameter portion spaced rearwardly of said leading end of said collar and extending beyond the end of said collar remote from said leading end of said collar; and
said biasing means is a coil spring surrounding said reduced diameter portion of said probe shaft and extending between said shaft and said collar.

6. A combination as set forth in claim 5, wherein:
said ejection means includes an ejection button; and
said reduced diameter portion of said probe shaft includes a trailing end extending beyond the end of said mounting collar remote from said leading end of said collar, said trailing end of said probe shaft terminating in said ejection button.

7. A combination as set forth in claim 1, wherein:
said mounting end is of a larger diameter than said sensing end.

8. A combination as set forth in claim 1, including:
a shoulder formed in said tube and adapted to engage said leading end of said collar as a limit stop.

9. A combination as set forth in claim 1, wherein:
said sensing end of said cover includes a heat conductive shield having a prescribed heat mass.

10. A combination as set forth in claim 9, wherein:
said shield is substantially conical.

11. A temperature sensing probe and probe cover, comprising:
a cover mounting collar having a leading end;
probe cover retaining means on said mounting collar, said cover retaining means including a resilient ring seated within a circumferential groove defined in said mounting collar;
an elongated probe shaft, concentric with said mounting collar and moveable along the common axis of said collar and said shaft, said probe shaft having a temperature sensing tip at the leading end of said shaft remote from the leading end of said collar;
biasing means for resiliently urging said probe shaft and sensing tip forwardly of said leading end of said mounting collar; and
a cover mounted on said probe in engagement with said cover retaining means.

12. A temperature sensing probe and probe cover, comprising:
a cover mounting collar having a leading end;
an ejection button;
an elongated probe shaft, concentric with said mounting collar and moveable along the common axis of said collar and said shaft, said probe shaft having a temperature sensing tip at the leading end of said shaft remote from the leading end of said collar, said probe shaft having a trailing end remote from said sensing tip and extending beyond the end of said mounting collar remote from said leading end of said collar, said trailing end of said probe shaft terminating in said ejection button;
biasing means for resiliently urging said probe shaft and sensing tip forwardly of said leading end of said mounting collar; and
a cover for said probe supported on said cover mounting collar.

13. A temperature sensing probe and probe cover, comprising:
a cover mounting collar having a leading end;
an elongated probe shaft, concentric with said mounting collar and moveable along the common axis of said collar and said shaft, said probe shaft having a temperature sensing tip at the leading end of said shaft remote from the leading end of said collar, said probe shaft including a reduced diameter portion spaced rearwardly of said leading end of said collar and extending beyond the end of said collar remote from said leading end of said collar;
biasing means for resiliently urging said probe shaft and sensing tip forwardly of said leading end of said mounting collar, said biasing means including a coil spring surrounding said reduced diameter portion of said probe shaft and extending between said shaft and said collar; and
a cover for said probe supported on said cover mounting collar.

* * * * *